Nov. 23, 1937. E. J. SVENSON 2,099,776
MATERIAL WORKING APPARATUS
Original Filed Nov. 7, 1930 7 Sheets-Sheet 4

Patented Nov. 23, 1937

2,099,776

UNITED STATES PATENT OFFICE 2,099,776

MATERIAL WORKING APPARATUS

Ernest J. Svenson, Rockford, Ill.

Application November 7, 1930, Serial No. 494,045
Renewed September 23, 1937

39 Claims. (Cl. 90—21.5)

My invention relates generally to material working apparatus, and particularly to apparatus, such as milling machines equipped with hydraulic systems of control.

One of the problems confronting the manufacturer of material working apparatus, such as milling machines, is that of overcoming difficulties which necessarily result when the work piece is not uniformly fed into association with a rotary cutter. These difficulties have presented themselves in connection with mechanically driven machines, as well as hydraulically actuated devices. Stuttering and nonuniform movement of machine parts driven by hydraulic actuators frequently results from leakage in the fluid circuits. Over-heating of the fluid propelling medium, such as oil, has often occurred in conventional hydraulically actuated machine tools, and obviously such conditions within a circuit make for marked decrease in operating efficiency.

It is one of the primary objects of my present invention to overcome many of the disadvantages which have been experienced heretofore with mechanical, as well as hydraulically controlled apparatus, and to this end I propose to provide a material working apparatus equipped with a hydraulic system of control, which is extremely simple in arrangement, positive in operation, and adapted to afford continued service over an extended period of time without requiring adjustment, repair, or replacement.

More specifically, my invention contemplates the provision of a hydraulic system of control, which is adapted to effect rapid traverse and feeding movements of a machine element at predetermined intervals.

A further object of my invention is to provide a hydraulic actuator system for reciprocating a machine part, by means of which said machine part may be subjected to rapid traverse and feeding movement in opposite directions, and said movements may be automatically controlled within very close operating limits, that is to say, my invention contemplates the instantaneous shifting from one rate or direction of movement to another without subjecting the controlling circuits to any disturbing effects which tend to impair the operating efficiency of the machine.

It is another object of my invention to provide, in combination with an actuator system including a feeding circuit and a rapid traverse circuit, improved means responsive to the flow of fluid in the rapid traverse circuit to control the rate and direction of flow of fluid in the feeding circuit, and to this end I propose to provide a simple valve arrangement which is shiftable in response to fluid pressure from the rapid traverse circuit, and this valve arrangement is connected with the high pressure or feeding circuit, and serves to direct fluid from said circuit to a hydraulic actuator.

Still another object of my invention is to provide a hydraulic system of control as above set forth, in which the flow of fluid in a feeding or high pressure circuit may be selectively controlled in response to the flow of fluid in a secondary or low pressure circuit.

Still another object of my invention is to provide, in combination with the shiftable parts of a milling machine, such as a milling machine table and associated elements, an improved hydraulic system of control of the type set forth above, whereby the feeding and rapid traverse movements of the milling machine table may be accurately and positively controlled either automatically or manually.

In addition to the above mentioned advantages, my invention contemplates the privision of a hydraulic system of control, which particularly lends itself for use in connection with material working apparatus, such as milling machines wherein it is desirable to automatically effect the reversal of the spindle rotation simultaneously with the reversal of the work table.

A still further object of my invention is to provide, in combination with a shiftable machine element, such as a milling machine table, a new and improved hydraulic system of control, whereby the intermittent rapid traverse and feeding movement of said table in either direction may be very conveniently and positively governed.

Still another object of my invention is to provide a hydraulic system of control as above set forth, in which a feeding or high pressure circuit and a rapid traverse or low pressure circuit are so arranged and coupled with an actuator piston that means, such as a selector valve, will be operable in response to the action of the fluid in the low pressure or rapid traverse circuit, to automatically select the proper sides of the feeding or high pressure circuit, and in this manner selectively control the direction of fluid from the high pressure circuit to said hydraulic actuator.

The foregoing and numerous other objects and advantages will be more apparent from the following detailed description when considered in connection with the accompanying drawings, wherein—

In order to clearly set forth one practical application of my invention, I propose to describe the same in connection with a milling machine. In accordance with the general features of the invention, I propose to employ a hydraulic actuator system for automatically or manually controlling the feeding and rapid traverse movements of the milling machine table. A high displacement low pressure pump, such as a gear pump, is employed to deliver fluid for rapid traverse purposes to an actuator cylinder equipped with a reciprocable piston which is connected to the milling machine table. A low displacement high pressure pump, such as a variable displacement plunger pump, is employed to deliver fluid to the actuator cylinder for imparting feeding movement to the table. A main control valve of the three-position type, which may be manually shifted or which may be shifted by dogs associated with the table, serves to control the direction of delivery of low pressure fluid for rapid traverse purposes to the actuator cylinder, and also serves when in its neutral position, to render the low pressure circuit functionally inoperative. Another shiftable valve which might be termed an automatic direction control valve, is connected with the high pressure variable displacement pump, and is shiftable in response to the flow or pressure of the low pressure fluid. Thus, when the actuator is subjected to rapid traverse in a given direction by the low pressure fluid in response to the shifting of the main control valve, the direction control valve is simultaneously shifted and is thereby conditioned to direct high pressure fluid to the actuator in the same direction as the low pressure fluid. In other words, said direction control valve is operable in response to the flow of fluid in the rapid traverse or low pressure circuit to selectively connect the high pressure circuit with the intake side of the actuator cylinder. At this point it should be noted that when the main control valve is shifted to effect rapid traverse of the table actuator, a clutch control valve is shifted in response to fluid pressure in the rapid traverse circuit, and in this shifted position of the valve causes a hydraulic actuator to effect the disengagement of a clutch mechanism connected with the main drive. Thus it will be clear that the milling machine spindle is stationary during the rapid traverse in either direction of the table. A second hydraulic clutch actuator is employed to control the direction of rotation imparted to the milling machine spindle. When the main control valve is automatically or manually shifted to its neutral position, the rapid traverse or low pressure circuit is rendered functionally inoperative for propelling purposes, and the clutch mechanism on the main drive causes power to be transmitted to a main drive shaft of the milling machine, and the other clutch mechanism, which might be termed a reversing clutch, causes rotation to be imparted to the spindle in a direction corresponding to the direction of travel of the table. By a suitable arrangement I am able to control the intermittent rapid traverse and feeding movements of the table in either direction in a very expeditious manner, the milling cutter being rendered non-rotatable during the rapid traverse movements, and its rotation being always in accordance with the direction of movement of the milling machine table.

Machine structure

Having given a general description of the mechanism shown in the accompanying drawings, I shall now proceed to describe said mechanism in detail.

As stated above, I prefer to describe my improved hydraulic system of control in connection with a milling machine, and in order to more clearly understand the functioning of the hydraulic circuits, etc., I shall first describe in a general way the milling machine structure. Referring to Figures 1 to 4 inclusive, it will be observed that I have shown a milling machine having a main frame or casting 20. Horizontally slidable upon this main frame is a suitable work supporting table 22, the opposite extremities of this table being connected by brackets 24 and 26 to a piston rod 28, which forms a part of a hydraulic table actuator designated generally by the numeral 30 in Figure 4. This actuator includes a cylinder 32 sealed at opposite extremities by suitable stuffing boxes 34 and 36, and an actuator piston 38 positioned intermediate the extremities of the piston rod 28. Thus movement in both directions may be imparted to the table 22 by introducing a fluid propelling medium within the cylinder 32.

Figure 1:
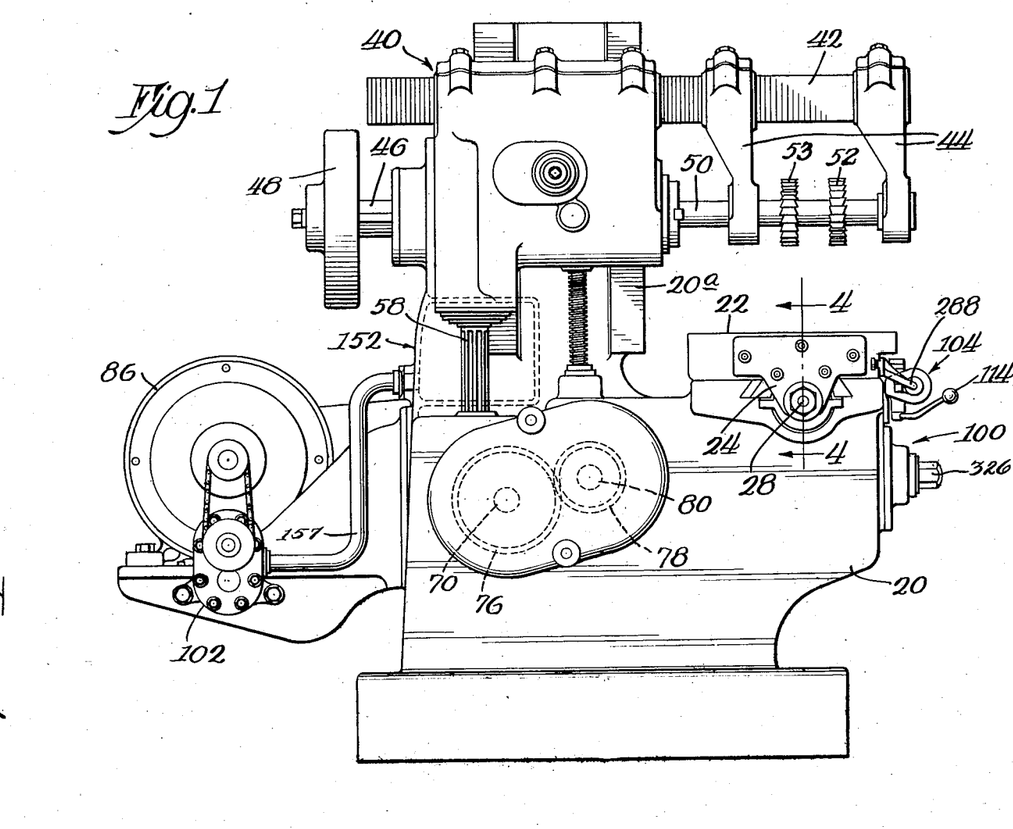
Figure 1 is a side elevational view of a milling machine equipped with a hydraulic system of control which is representative of one embodiment of my invention.
Figures 3, 4:
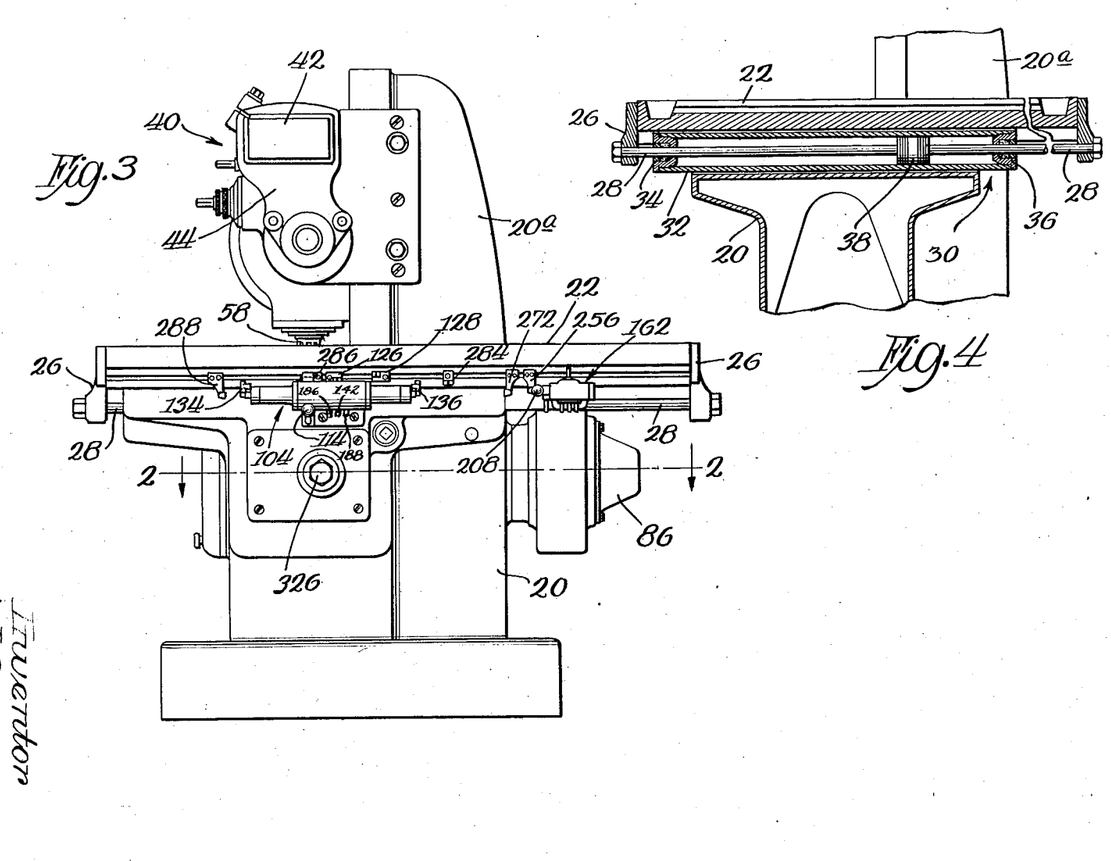
Figure 3 is a front elevational view of the machine as viewed from the right of Figure 1.
Figure 4 is a fragmentary vertical sectional view taken centrally and longitudinally of the hydraulic actuator for the milling machine table, said view being taken substantially along the line 4—4 of Figure 1.
Figure 5:
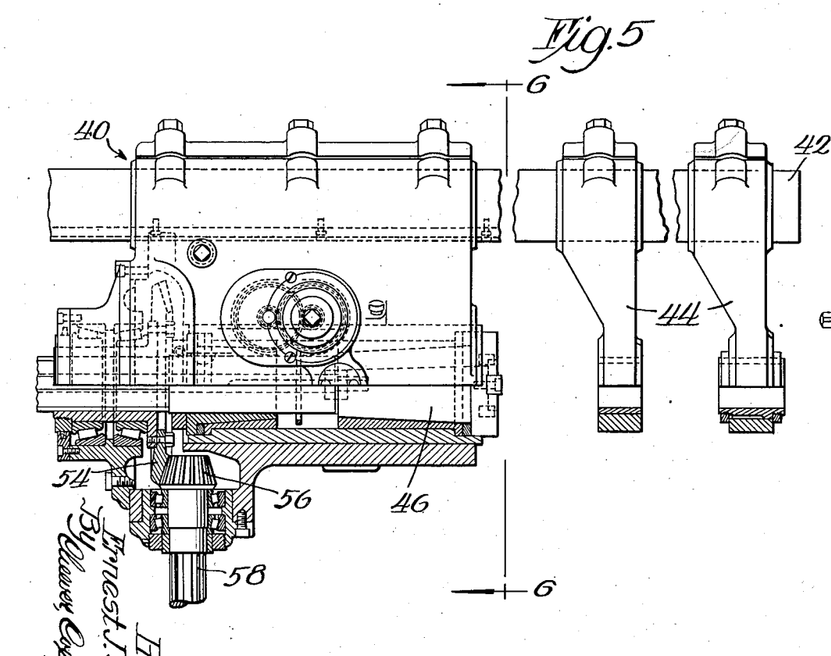
Figure 5 is an enlarged detail view, shown partially in section, of the spindle headstock and associated driving mechanism.
Figure 6:
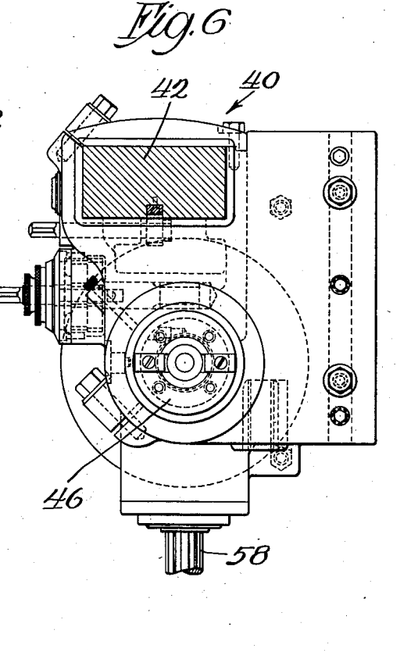
Figure 6 is an end section, as viewed from the right of Figure 5, on the line 6—6.

The main frame 20 is provided with an upright frame section 20a, and this frame section 20a provides an adjustable support for a spindle headstock designated generally by the numeral 40. The upper portion of the headstock 40 carries an over-arm 42, and depending from this over-arm 42 are a pair of similar arbor supporting arms 44. A main spindle 46, Figures 1, 3, and 5, is rotatably mounted within the head stock 40. The outer extremity of the spindle carries a suitable fly wheel 48, and the inner extremity thereof is adapted to receive a conventional cutter arbor 50, this arbor serving to support suitable milling cutters 52 and 53.

Power is supplied to the spindle 46 through a gear 54 on the spindle, which meshes with a companion bevel gear 56 carried at the upper extremity of a vertical spline shaft 58. The lower extremity of this spline shaft 58 is slidable within and driven by a gear 60, Figure 2, which is suitably mounted within the machine frame. The gear 60 is rotated in one direction by means of a gear 62, and in the opposite direction through the agency of a similar gear 64, said gears 62 and 64 being mounted within suitable roller bearings 66 and 68 respectively. A shaft 70 extends through the gears 62 and 64 and is provided at its medial portion with a shiftable clutch element 72. When this clutch element 72 is shifted to the left in response to the actuation of a hydraulic actuator 74, Figure 2, (later to be described), a driving connection is established between the shaft 70 and the gear 62, and when said element is shifted to the right, connection is established between the shaft and the gear 64. Thus the clutch element 72 forms a part of a clutch mechanism which serves to control the direction of rotation of the spline shaft 58 and consequently the direction of rotation of the spindle 46.

Figure 2:
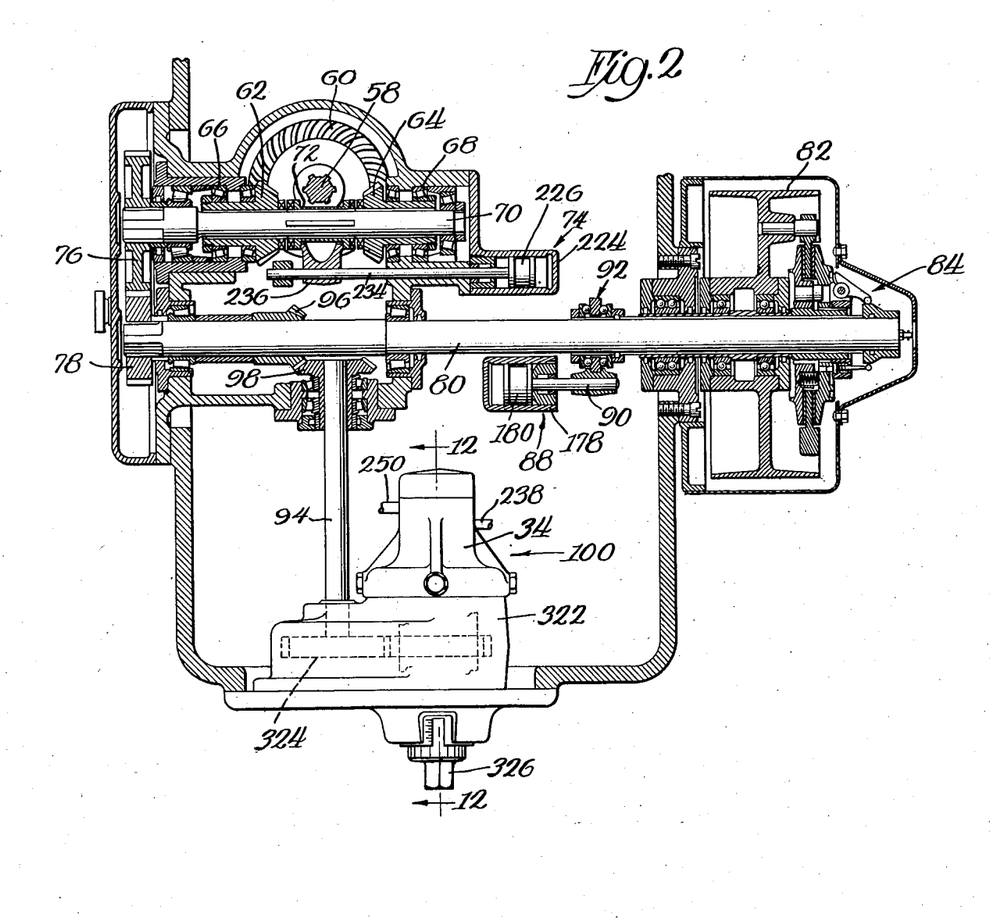
Figure 2 is a horizontal sectional view taken substantially along the line 2—2 of Figure 3, disclosing the general arrangement of the driving elements, with the feed pump shown in elevation.

Power is supplied to the shaft 70 through a pickoff gear 76 and a companion gear 78 mounted upon one extremity of a second drive shaft 80, Figure 2. This drive shaft 80 is adapted to be connected with and disconnected from a suitable pulley 82 through the agency of a suitable clutch mechanism 84. This pulley 82 is driven from a suitable prime mover or electric motor 86, Figure 1, and the clutch mechanism 84 is controlled by means of a hydraulic actuator 88, (in a manner later to be described). This actuator 88 is connected by means of the piston rod 90 with a mechanism 92, which is rotatable with the shaft 80 and shiftable longitudinally thereof, the outer extremity of the mechanism 92 being connected with one element of the clutch mechanism 84. Thus when the mechanism 92 is shifted to the right, Figure 2, a driving connection will be established between the pulley 82 and the shaft 80, and when the device 92 is shifted to the left, the shaft 80 is disconnected from the power supplying pulley 82.

The drive shaft 80 is connected to a second drive shaft 94 by means of gears 96 and 98, and the outer extremity of this shaft 94 is connected by means of a suitable driving gear with a high pressure variable displacement plunger pump, which I have designated generally by the numeral 100. A low pressure variable displacement gear pump 102, Figure 1, is continuously driven by the prime mover or motor 86. A pump suitable for this purpose is shown in my co-pending application, Serial No. 481,741, filed September 13, 1930. The manner in which these pumps function to effect rapid traverse and feeding movements of the table 22 will be presently described.

Main control valve

Figure 15:
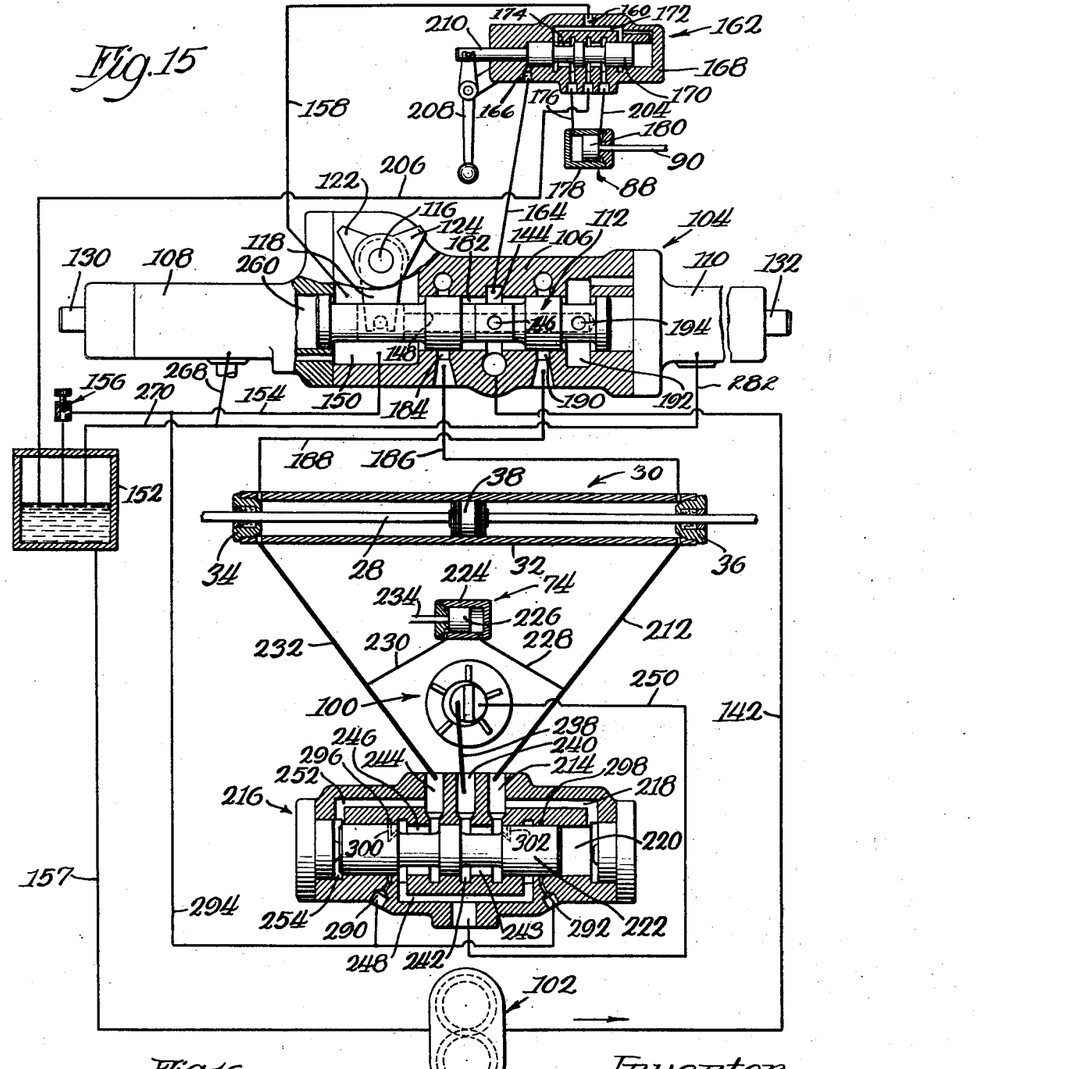
Figure 15 is a semi-diagrammatic view disclosing the circuit arrangements of my improved hydraulic system of control.

Bearing in mind the general structural arrangement of the milling machine as just described, attention is directed to my improved system for hydraulically controlling the rapid traverse movements of the table 22. Referring to the circuit diagram shown in Figure 15 and also Figures 3 and 7, it will be seen that I employ a main control valve 104. This control valve 104 includes a central casing or section 106, an end section 108, and a similar oppositely disposed end section 110. A valve member 112 is reciprocable within the valve 104 and is capable of occupying three shifted positions. In Figure 15 the valve 112 is shown in its neutral position, and said valve is capable of being shifted to the left and right of said neutral position. The valve member 112 is adapted to be manually shifted through the agency of a suitable control handle 114, which is conveniently positioned at the front of the milling machine, as clearly shown in Figures 1 and 3. The inner extremity of this handle 114 is connected to the lower extremity of a pin 116, and an arm 118, Figure 15, extending radially and movable with the pin 116, is connected with a pin 120 carried by the valve member 112. Thus, the shifting of the valve 112 may be manually controlled by the manipulation of the control handle 114. The automatic shifting of the valve 112 is occasioned through the agency of a pair of radial fingers 122 and 124 carried by the pin 116, and these fingers are adapted to be engaged by companion dogs as, for example, dogs 126 and 128 respectively. These dogs are adjustably supported by the table 22 and may be positioned so as to effect the shifting of the main valve 112 at proper predetermined intervals in accordance with the nature of the work to be accomplished by the machine. The end valve section 108 slidably supports a shiftable balancing member 130, (later to be described), and the casing section 110 slidably carries a similar balancing member 132. The shifting of these members 130 and 132 is controlled by levers 134 and 136 pivotally supported on the valve casing sections 108 and 110 respectively. Suitable spring-pressed plungers 138 and 140 serve to maintain contact between the lower ends of the levers 134 and 136 with the adjacent outer extremities of the balancing members 130 and 132, as clearly shown in Figure 7.

System of rapid traverse control

It should be noted that the main control valve 104 is connected to the discharge side of the gear pump 102 by a pipe line 142. This pipe line 142 directs low pressure fluid from the gear pump to a central annular valve port 144, Figures 7 and 15. When the valve member 112 occupies the neutral position shown in Figure 7, low pressure fluid, which enters the annular port 144, is directed through a radial port 146 in the valve member 112 and a longitudinal passageway 148 into a chamber 150. This chamber 150 is connected with a reservoir 152 by a pipe line 154 and a device 156 having an adjustable restricted orifice. Thus, when the main valve occupies its neutral position, low pressure fluid is circulated therethrough and returned to the reservoir 152 without imparting any movement to the actuator piston 38, and it will be seen that the reservoir 152 is connected to the intake side of the gear pump 102 by a pipe line 157, Figure 1.

Figures 7, 8, 9, 10, 11:
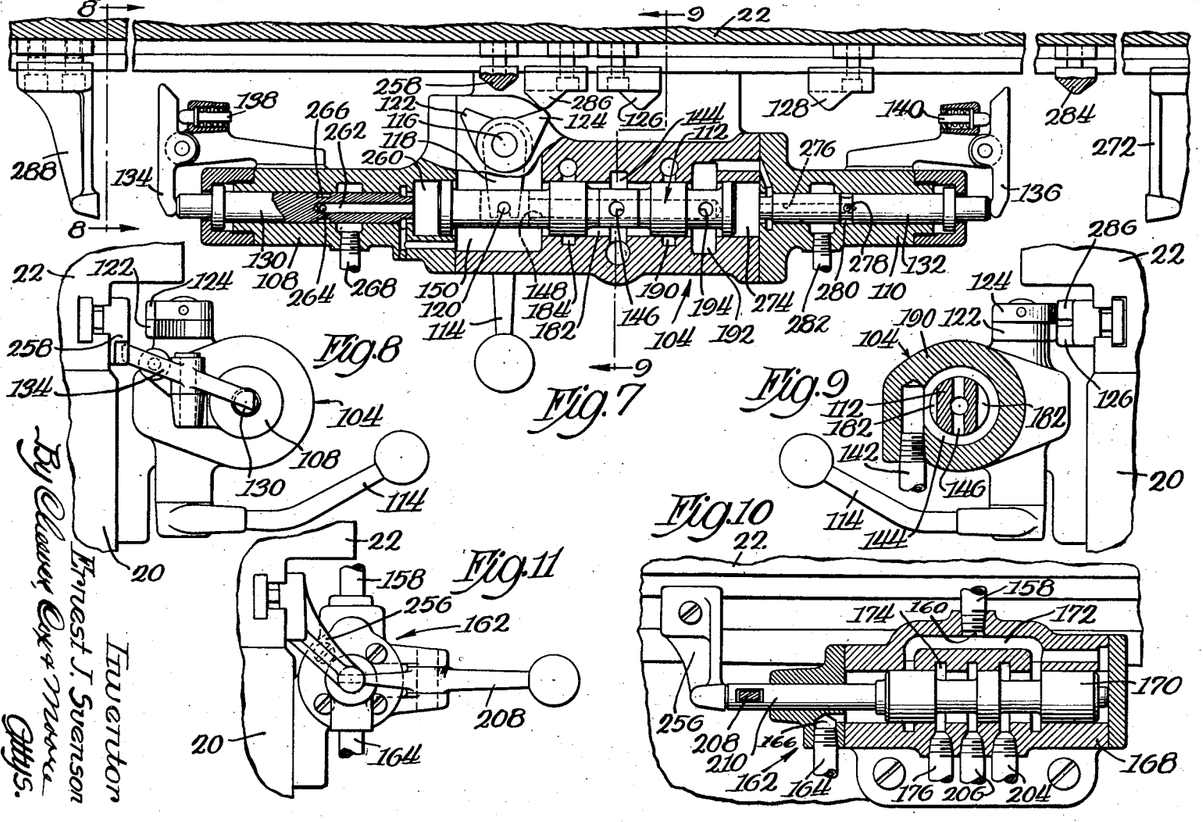
Figure 7 is an enlarged central sectional view of the main control valve, said valve being shown in operative association with the milling machine table.
Figure 8 is an end view of the main control valve as viewed from the left of Figure 7 substantially along the line 8—8.
Figure 9 is a transverse vertical sectional view of the main control valve taken substantially along the line 9—9 of Figure 7.
Figure 10 is an enlarged detail sectional view of the automatically operable valve for controlling the starting and stopping of the machine spindle.
Figure 11 is an end elevational view taken from the left end of the valve shown in Figure 10.

In this connection attention is directed to a pipe line 158, which communicates at one extremity with the valve chamber 150, and at its opposite extremity with a port 160 of a starting and stopping valve denoted generally by the numeral 162, Figures 10, 11, and 15. Another pipe line 164 connects the annular valve port 144 with a port 166 of the valve 162. The valve member 162 includes a suitable housing 168 and a valve member 170 which is reciprocable within said housing. Thus, it will be apparent that when the main valve 104 is in its neutral position, as described above, the fluid pressure within the valve 162 will be equalized, and the valve member 170 will remain in the position shown in Figure 15. In this position low pressure fluid from the pipe line 158 passes through the valve port 160, a valve passage 172, an annular valve port 174, and then into a pipe line 176, which connects with one end of the hydraulic actuator 88. This actuator 88 includes a cylinder 178 and a piston 180, which is connected through the rod 90 with the clutch shifting device 92, Figure 2. Thus, when the main valve member 112 occupies its neutral position as shown in Figure 15, the low pressure fluid entering the valve 162 from the pipe line 158 is directed against the actuator piston 180, and thereby causes the clutch mechanism 84 to be engaged. That is to say, when the main valve member 112 occupies its neutral position, the valve 162 is automatically positioned so as to effect the movement of the actuator piston 180 to the right, and thereby operatively connect the pulley 82, Figure 2, with the drive shaft 80.

Consider now that the valve member 112 is shifted to the left so as to direct low pressure fluid from the annular port 144 through lateral ports 182, which are now in communication with a second annular valve port 184, Figures 7 and 15. This annular port 184 is connected to the right extremity of the actuator cylinder 32 by means of a pipe line 186. The opposite extremity of the cylinder 32 is connected by a pipe line 188 to an annular port 190 of the valve 104, and thus the return fluid passes through this annular port 190 into a valve chamber 192. This valve chamber 192 is connected with the passageway 148 through a radial port 194, Figure 15. In this manner fluid from the return pipe 188 is returned to the low pressure chamber 150 and thence through the return pipe line 154. Thus, when the main valve member 112 occupies its shifted position to the left, the actuator piston 38 and consequently the milling machine table 22 will be urged to the left, Figures 4 and 15.

It should be noted that the instant that the main valve member 112 is shifted to the left, the fluid pressure within the annular port 144 is increased, thereby causing increased pressure within the pipe line 164. This causes the automatic shifting of the valve member 170 to the right, Figure 10, and in this position low pressure fluid is directed from the valve 162 through a pipe line 204 and into the right end of the actuator cylinder 178. This causes the piston 180 to be shifted to the left, thereby effecting the instantaneous disengagement of the main clutch 84. In other words, the instant the actuator piston 38 is subjected to rapid traverse movement, the power supply is disconnected from the shaft 80, and consequently the milling machine spindle 46 is stopped. If the main control valve 112 is shifted to the right, low pressure fluid will be delivered from the pipe line 188 to the left end of the cylinder 32, and thus cause the rapid traverse movement of the piston and the milling machine table to the right. Under such circumstances the valve 170 will be maintained in its shifted position to the right, Figure 10, thereby causing the main control clutch 84 to be disengaged. It should be noted that a pipe line 206 connected to the valve casing 168 serves to return fluid from the valve 162 to the reservoir 152. If it is desired to manually control the movement of the valve member 170, a hand lever 208 may be employed.

From the foregoing it will be apparent that when the main valve member 112 is shifted to its neutral position shown in Figure 15, the pressure in the annular port 144 and the chamber 150 will be equalized, and in view of the fact that there is a greater area to be acted upon by the fluid at the right extremity of the valve 170 than there is at the left thereof, due to the presence of a shifter rod 210, said valve member will be instantaneously shifted to the left, and in this position will cause fluid to be directed through the pipe line 176 so as to operate the actuator piston 180, and thereby cause the immediate engagement of the clutch mechanism 84. This causes power to be delivered to the milling machine spindle 46. In the event that it is desired to manually control the shifting of the valve member 170, an extension may be formed at the right end of said valve member, said extension having a diameter equal to the diameter of the rod 210. Under such conditions there will be no unbalanced pressures to effect the shifting of the valve member when the main control valve 104 is shifted to neutral position.

System of feed control

From the foregoing it will be apparent that, when the valve member 112 is shifted to the left, the actuator piston 38 will be moved at a rapid traverse rate to the left, and that the driving pulley 82 will be disconnected from the drive shaft 80 so as to render the milling machine spindle 46 non-rotatable. Likewise, when the valve member 112 is shifted to the right, the actuator piston 38 will be shifted at a rapid traverse rate to the right.

Attention is now directed to the fact that, when the valve member 112 is shifted, as for example, to the left, Figure 15, and fluid is directed from the pipe line 186 into the right end of the actuator cylinder 32, a portion of said low pressure fluid will pass through a pipe line 212 into a port 214 provided in an automatic direction valve designated generally by the numeral 216. This fluid will pass from the port 214 through a passageway 218 into an end chamber 220, thereby causing a valve member 222 to be automatically shifted to the left, Figure 15. Contemporaneously with the shifting of this valve member, the hydraulic actuator 74, which includes a cylinder 224 and a piston 226, functions as a result of fluid passing from the pipe line 212 through a connecting pipe line 228 into the right end of the cylinder 224. Fluid from the other end of the cylinder 224 is returned through a pipe line 230 which connects with a pipe line 232. The piston 226 is connected by means of a rod 234 with a clutch shifting member 236, Figure 2. Thus, when the element 236 is shifted to the left, a driving connection will be established between the clutch drive shaft 70 and the driven hypoid gear 60 through the agency of the companion driven hypoid gear 62. In this manner the clutch 72 is conditioned to impart rotation in a proper direction to the milling machine spindle the instant that the clutch mechanism 84 is operated to establish driving connection between the pulley 82 and the drive shaft 80.

The plunger pump 100, which is shown diagrammatically in Figure 15, is of a non-reversible type and is adapted to supply fluid under pressure through a discharge pipe line 238, which connects with a port 240 of the direction valve 216. This port 240 communicates with an annular port 242, and when the valve member 222 is shifted to the left, as shown in Fig. 15, it is conditioned to direct high pressure fluid from the port 242 through an annular port 243 into the port 214. Thus, it might be stated that the direction valve 216 is operable in response to the fluid from the low pressure or rapid traverse circuit. The instant that the main control valve 104 is shifted to neutral position, rotation is automatically imparted to the milling machine spindle 46, and power is supplied to the variable displacement pump 100. In other words, the instant that the main control valve is shifted to neutral, the low pressure circuit is rendered functionally inoperative with respect to the actuator piston 38, and the high pressure or feeding circuit, which includes the plunger pump 100, is rendered functionally operative to effect the feeding movement of the actuator piston 38 in a direction similar to the direction in which it was previously advanced by fluid from the low pressure circuit. Fluid from the left end of the actuator cylinder 32 is directed through a pipe line 232 into a valve port 244, which at this instant communicates through an annular port 246 with a passageway 248. This passageway 248 is connected by a pipe line 250 with the intake side of the plunger pump 100.

Consider now that the main control valve 104 has been shifted to the right. In this position low pressure fluid will be directed through the pipe line 232 into the valve port 244, and thence through a passageway 252 into an end chamber 254. This causes the shifting of the valve member 222 to the right, thereby conditioning the high pressure or feeding circuit so as to subsequently cause the actuator piston 38 to be shifted to the right at a feeding rate. A portion of the low pressure fluid from the pipe line 232 passes through the pipe line 230 and into the left end of the cylinder 224 of the spindle reversing actuator 74, and thus causes the gear 64, Figure 2, to be operatively connected with the drive shaft 70. In other words, the rotation of the milling machine spindle is always in accordance with the direction of movement of the table. That is to say, the instant that the table is shifted in a reverse direction, the rotation of the spindle is correspondingly reversed. From the foregoing it will be apparent that regardless of the direction of travel of the milling machine table, the spindle rotation may be controlled so as to effect the rotation of the cutter on the arbor 50 against the feed of the table, bringing the force downward on said table.

*Full automatic control*

Assume that a work piece has been placed upon the milling machine table 22, and that the motor 86 is operating so as to continuously drive the gear pump 102, and to impart rotation to the main drive pulley 82, Figure 2. Assume further that the main control valve occupies the neutral position shown in Figure 7, and that the milling machine table occupies its starting position, as shown in Figures 3, 4, and 7. It should be noted that when the table is in the position shown in said figures, a dog 256, Figure 3, engages the shifter rod 210 of the clutch starting and stopping valve 162, and thus maintains the clutch mechanism 84 disengaged so that no power is being delivered to the milling machine spindle or the plunger pump. Upon shifting the control handle 114 to the left, fluid from the gear pump will be directed from the main control valve 104 to the right end of the actuator cylinder 32 so as to move the table 22 at a rapid traverse rate to the left. The dog 126 carried by the table 22 is so positioned that when the work supported by the table reaches its companion milling cutter 52 carried by the arbor 50, said dog will engage the radial finger 122 and thereby cause the valve member 112 to be returned to its neutral position. It should be noted that during the initial rapid traverse movement of the table, the starting and stopping valve 162 is maintained in its shifted position to the right, Figure 10, due to the unbalanced fluid pressure within said valve and the milling machine spindle is secured against rotation. The instant that the main control valve is returned to its neutral position, as a result of the engagement of the dog 126 with the finger 122, the valve 162 is automatically shifted to its extreme left position, Figure 15, as described above, thereby causing the engagement of the clutch mechanism 84 so as to impart rotation to the spindle 46 and the driving mechanism of the pump 100. At the same instant the direction control valve 216, which was previously shifted to the left in response to the pressure of the fluid in the low pressure circuit, serves to direct high pressure fluid from the plunger pump 100 into the right end of the actuator cylinder 32, and thus continues the advancement of the milling machine table at a feeding rate. When the cut upon the work piece has been completed, a dog 258 carried by the table 22 engages the lever arm 134, thereby causing the shifting of the balancing member 130 to the right, Figure 7. This establishes communication between the reservoir 152 and an end chamber 260 of the control valve 104 through a passageway 262, a radial port 264, and an annular port 266 in the balancing member 130. Thus fluid in the end chamber 260 is relieved against pressure and is free to return to the reservoir 152 through pipe lines 268 and 270, Figure 15. Relieving fluid pressure within the end chamber 260 causes the valve member 112 to be suddenly shifted to the left, thereby again causing the table 22 to be moved at a rapid traverse rate to the left. When the table has reached a predetermined position, a dog 272, Figs. 3 and 7, is moved into engagement with the lower end of the lever 136, thereby causing the balancing member 132 to be shifted to the left, Figure 7. Fluid within an end chamber 274 of the valve is now free to flow through a longitudinal passage 276, a radial port 278, an annular port 280, and a pipe line 282, which connects with the return pipe line 270, Figure 15. In this manner the fluid pressure within the valve 104 is unbalanced, and the valve member 112 immediately and suddenly shifts to the right, thereby causing a reversal in a rapid traverse movement of the table 22. From the foregoing description it will be clear that, upon the reversal of the table movement, the hydraulic actuator 74 operates to effect the reversal of rotation of the spindle 46, and the valve member 222 of the direction control valve 216 is shifted to the right and is thereby conditioned to connect the plunger pump 100 to the left side of the actuator cylinder 32, when said pump is again rendered functionally operative. The dog 128 is eventually moved into engagement with the radial finger 124, which has now been swung to its uppermost position, and this causes the valve member 112 to be shifted to its neutral position. The engagement of the dog 128 with the finger 124 may be timed so as to take place just as the milling cutter 53 engages a second work piece carried by the table 22. A feeding movement is imparted to the table until a dog 284 is moved into engagement with the upper end of the lever 136. This causes the unbalancing of the valve 104, thereby effecting the sudden shifting thereof to the right so as to subject the table 22 to rapid traverse movement in the same direction, and the immediate stopping of the milling machine spindle. As the table reaches the limit of its rearward movement, a dog 286 is moved into engagement with the finger 124, thereby shifting the main control valve to neutral position so as to arrest the movement of the table 22. Contemporaneously with the stopping of the table 22, the dog 256 engages the rod 210 of the starting and stopping valve, thereby preventing the shifting of the valve 170 to the left when the main valve is shifted to its neutral position. In this manner a complete automatic reciprocation of the table is effected it being only necessary for the operator to shift the main control handle 114 to the left in order to initiate the cycle of operation.

Figure 16:
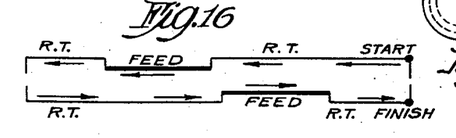
Figure 16 is a diagrammatic representation disclosing a cycle of operation capable of being performed by the use of my invention.

It should be noted that I also disclose another dog 288, Figure 3, which may be employed in the event that a continuous repeated reciprocation of the table 22 is desired. This dog 288 is adapted, when the table reaches the limit of its rearward movement, to engage the lower end of the lever arm 134, thereby effecting the automatic reversal of the table. When this dog 288 is employed, the dog 256 may be shifted to an inoperative position, and when the dog 256 is used, the dog 288 may be shifted to an inoperative position, as shown in the drawings. It should be understood that my invention is in no sense limited to the specific arrangement of the dogs, nor to the particular number of dogs shown in the drawings. In Figure 16 I have shown a diagrammatic representation of the cycle of operation just described, but it should be clearly understood that numerous other cycles of operation of the machine may be obtained by a mere rearrangement of the dogs on the table. The cycle of operation which I have described may be referred to as one which permits intermittent movement in both directions of the table, all of said movements being automatically and positively controlled.

Attention is directed to vents or restricted openings 290 and 292 provided in the automatic direction control valve 216, Figure 15. These vents communicate through a pipe line 294 with the reservoir 152 and connect at their inner extremities with an annular passage or port 296 and 298. These annular ports 296 and 298 communicate respectively with the lateral ports 246 and 243 of the valve member 222 through passageways 300 and 302. Thus, when the valve member 222 occupies the position shown in Figure 15, low pressure fluid supply communicates with the low pressure side of the circuit so as to take care of any leakage within the stuffing box 34. When the valve member 222 is shifted to the right, the low pressure fluid supply is connected with the opposite side of the fluid circuit, and thereby takes care of any leakage which might result from the wear in the stuffing box 36.

High pressure plunger pump

While this invention does not relate to the specific types of pumps employed for effecting the shifting of the table 22, these pumps enter into the general combination which brings about the shifting of the table, and the inherent structural features of the plunger pump 100 enter into said combination so as to render the functioning of the fluid circuits very efficient. This plunger pump 100 is similar to the pump disclosed in my co-pending application, Serial No. 481,741, filed September 13, 1930. A detailed description of this plunger pump is not essential to a clear understanding of the present invention, but certain of the structural features thereof are of great importance in connection with the functioning of the feeding circuit just described. This pump 100, Figures 12 to 14 inclusive, includes a stationary support or casing 304, which supports a plurality of radially disposed reciprocable pistons 306. The outer ends of the chambers in which these pistons are reciprocable communicate with inclined radial passageways 308. Reciprocation is imparted to the pistons 306 through the agency of an eccentrically adjustable driving ring 310, which is mounted on an anti-friction bearing 312. This bearing 312 is carried on the cylindrical portion of a rotary driving member 314. This driving member 314 is formed with a block or section 316, which is slidably dovetailed within a rotary driving sleeve 318. This driving sleeve 318 is rotatable within a suitable bearing 320 carried by an end casing 322, and rotation is imparted to the sleeve 318 by means of a gear 324, which meshes with companion gear teeth provided along the peripheral surface of a flange 318a of the sleeve 318.

Figure 12:
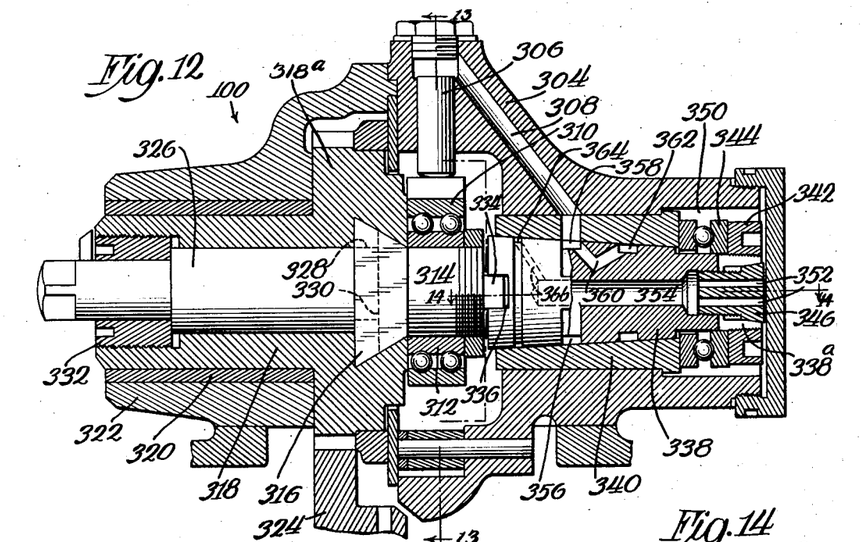
Figure 12 is an enlarged transverse sectional view of the variable displacement or feed pump, said view being taken substantially along the line 12—12 of Figure 2.

Lateral adjustment of the driving member 314 with respect to its driving sleeve 318 is effected by means of a cylindrical adjusting member 326. The inner extremity of this member 326 carries an eccentrically positioned projection 328 which is adapted to be received by a companion slot 330 in the section 316 of the driving member 314. Thus, when rotation is imparted to the member 326 by applying a suitable wrench (not shown) to the outer squared end thereof, the driving member 314 will be shifted transversely so as to vary the eccentricity of the driving ring 310 with respect to the axis of rotation of the driving sleeve 318. In other words, by rotating the member 326, the stroke of the pistons will be varied. A nut 332 is adapted to secure the adjusting member 326 in any fixed shifted position. The driving member 314 is provided with a tongue 334 which extends into a companion groove 336, provided in one end of a rotary valve member 338.

This rotary valve 338 is tapered and the large end thereof is positioned adjacent the driving member 314. A tapered bushing or bearing 340 provides a mounting for the tapered valve 338, and the outer extremity of said valve member is provided with a threaded extension 338a. A clamping ring 342 mounted upon the threaded end 338a serves to clamp an anti-friction thrust bearing 344 in position. The threaded end of the valve member is split so that when a screw 346 is tightened within the valve member, the threaded end 338a will be sprung outwardly so as to lock the clamping ring 342 in position. With this construction it will be apparent that the valve member 338 may be longitudinally adjusted and positively secured in its adjusted position.

Figures 13, 14:
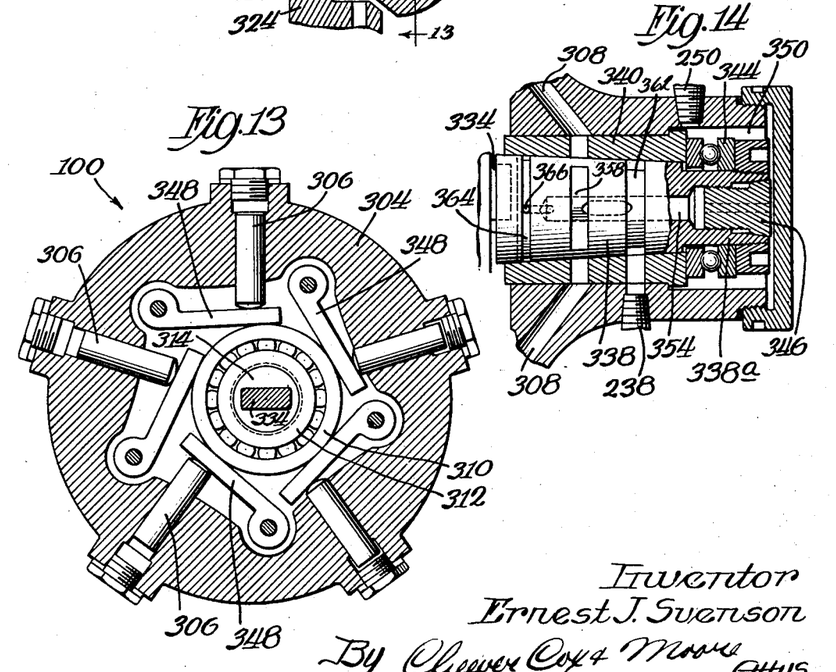
Figure 13 is a transverse sectional view of said pump taken substantially along the line 13—13 of Figure 12.
Figure 14 is a fragmentary central sectional view of the tapered valve arrangement and is taken along the line 14—14 of Figure 12.

From the foregoing it will be apparent that the driving member 314 rotates in unison with the tapered valve member 338, and that during this rotation reciprocation is experienced by the pistons 306, in the event that the driving ring 310 is eccentrically positioned, as shown in Figure 13. In this connection it might be stated that pivoted fingers 348 are employed to prevent the subjection of the pistons or plungers 306 to any undue side thrust. Fluid is introduced to the pump 100 through the pipe 250, Figure 15, which communicates with an end chamber 350. Fluid from this chamber 350 passes through passages 352 provided in the screw 346, and thence into a central valve passage 354. This central valve passage communicates with a peripheral port 356 of the valve member, and thus low pressure fluid from the passage 354 is directed to the passageways 308, which successively register with the peripheral port 356. During this registration of the passageways 308 with the port 356, the plungers 306 companion thereto are experiencing their inward or intake stroke. During the outward or compressing stroke of these plungers, fluid is directed out of said passageways through a peripheral port 358. This port 358 communicates through a passageway 360 with an annular port 362, and this annular port is continuously in communication with the discharge pipe 238.

The tapered arrangement of the valve member 338 prevents leakage of fluid longitudinally thereof to the right, Figures 12 and 14. Should any fluid be present along the periphery of the tapered valve member at the larger end thereof, an annular passage 364 will convey said fluid through a communicating passage 366, which terminates at its inner extremity within the valve passage 354. By employing the screw 346 and the associated clamping ring 342 in the described manner, I am able to positively secure the valve member against displacement toward its larger end in the event that high fluid pressures are developed which would urge the valve in that direction. By employing this construction, said valve member may be subjected to high pressure fluid conditions at either extremity without the slightest possibility of binding. Also, said valve may be accurately adjusted to provide the proper fluid film between the peripheral surface thereof and its bearing for lubrication purposes. By using a high pressure plunger pump, such as the pump 100 which is equipped with a stationary housing or support and a tapered valve construction as described, I am able to connect said pump within a closed hydraulic circuit, which includes the actuator cylinder 32, pipe lines 212 and 232, and the direction control valve 216.

Summary

From the foregoing it will be apparent that my invention contemplates the provision of a hydraulic system of control, which is broadly applicable for controlling the shifting of elements, such as machine parts and the like. It will also be apparent that my improved circuit arrangement enables the functioning of the feeding or high pressure circuit to be controlled in response to the functioning of the low pressure or rapid traverse circuit. In other words, the fluid pressure or flow of fluid within the low pressure circuit causes the actuation of the direction control valve 216, and this valve in turn conditions the feeding circuit so that, when the plunger pump is subsequently actuated, said pump will deliver fluid at high pressure to the hydraulic actuator for the table in the desired direction. The described system of controlling the high pressure and low pressure circuits should be clearly distinguished from systems which have been employed heretofore, as for example, systems which have employed five-position valves. In such conventional systems of control the five-position valve is continually maintained in connection with both the low and high pressure fluid, and in order to change said actuator from low pressure to high pressure control, or vice-versa, said five-position valve must be shifted past ports in such a manner that the stuttering or non-uniform movement of the actuator cannot be avoided. In other words, as said five-position valve is shifted from one position to another, a relatively slow change from low to high pressure operating conditions takes place, and during this interval the feeding circuit is subjected to pulsations or non-uniform pressure conditions, which seriously impair the functioning of a cutter which is being used upon the work piece. My invention provides a system whereby a change from low to high pressure fluid conditions, or vice-versa, may be obtained without the slightest possibility of experiencing pulsations or non-uniform operating conditions within the feeding circuits. In this connection it should be noted that my low pressure circuit operates independently of the high pressure circuit, and the high pressure or feeding circuit operates independently of said low pressure or rapid traverse circuit. In fact, the two circuits are never operatively connected. Furthermore, the sudden shifting of my control valves positively precludes the introduction of any pulsating effect. It should be noted that my improved direction control valve operates instantaneously and simultaneously with the shifting of the main control valve, and that the instant that the main control valve is shifted to neutral, the independently operable feeding circuit is rendered functionally operative. My improved arrangement of fluid circuits enables absolute uniform operating conditions, which conditions are not only superior to conditions which have been obtained heretofore by the use of hydraulic systems of control, but also are far superior to mechanical feeding devices.

My invention is by no means limited for use in connection with milling machines, but is capable of application in any instance where it is desirable to impart uniform movement to a shiftable element, to control the variation in rate of travel of said element, and to control the direction of movement thereof. My improved valve mechanism for controlling the starting and stopping of the spindle provides a very unique and effective means, which is of extremely simple construction. In fact, all of the control devices which I have described may be manufactured by the practice of conventional machine shop methods and serve to eliminate the necessity of employing complicated and numerous mechanical devices which have been used heretofore in controlling the movement of machine elements, such as milling machine tables and the like. In fact, my invention enables such machine elements to be hydraulically controlled with the use of a minimum number of machine parts, and with a minimum amount of skill and effort on the part of an operator.

While I have disclosed a particular type of plunger pump construction, it will be understood that other pump constructions may be employed, and in this connection I wish to refer to the type of pump disclosed in my co-pending application, Serial No. 430,867, filed February 24, 1930, which has since matured into Patent No. 1,989,117. In that application I have shown a plunger pump which may be adjusted without first stopping the pump. In other words, the stroke of the pistons may be adjusted during the functioning of the pump, and this construction is particularly convenient when it is desired to control fluid displacement during the operation of the machine with which the plunger pump is connected. Forms of gear pumps other than the forms shown in the drawings may be employed as, for example, the pumps disclosed in my co-pending applications, Serial No. 430,868, filed February 24, 1930, which has since matured into Patent No. 1,912,737 and Serial No. 437,959, filed March 22, 1930, which has since matured into Patent No. 1,912,738. Gear pumps of this type are adapted for continuous operation without subjecting the fluid to heating. Subjection of the fluid medium to excessive heat is one of the serious problems which has confronted manufacturers. When fluid, such as oil, is subjected to excessive heat, considerable difficulty results from leakage and the like. It should be noted that my gear pump may be adjusted independently of the displacement of the plunger pump.

Should it be desirable in certain instances to allow fluid to flow from the pipe line 154 through the pipe line 294, Figure 15, only when leakage takes place, as for example, leakage in the stuffing boxes 34 and 36, a suitable valve (not shown) may be employed for this purpose. In this connection reference is made to the type of valve shown in my co-pending application, Serial No. 481,742, filed September 13, 1930, which has since matured into Patent No. 2,078,696. By having the reservoir 152 and its associated parts properly positioned, I am able to positively eliminate the presence of air in the fluid circuit, and this obviously makes for uniform propulsion of the shiftable machine elements.

Attention is also direction to the fact that my plunger pump 100 is of the type which is automatically rendered functionally inoperative when the fluid actuator is subjected to sudden stoppage, as for example, when a metal to metal abutment is experienced by the milling machine table so as to positively prevent further forward movement thereof. In such instances the pistons of the plunger pump are automatically urged outwardly so that, as the driving ring 310 sweeps past the pistons, no reciprocation is experienced thereby. As soon as the abutment or obstacle is removed and the table is free to be shifted, the pump is automatically rendered functionally operative. For a more detailed description of the functional characteristics of this pump, reference is made to my co-pending application, Serial No. 439,306, filed March 27, 1930, which has since matured into Patent No. 2,078,695.

In compliance with the requirement made by the Patent Office during the prosecution of this application, claims broadly directed to a hydraulic system for actuating a movable element and the control therefor are being presented in a division application.

Having thus described my invention, what I claim as new and desire to secure by Letters Patent is:

1. In material working apparatus, a frame, a spindle rotatable within said frame, driving means for imparting rotation to said spindle, a fluid operated actuator, a variable displacement pump driven in timed relation with said spindle for delivering fluid at relatively high pressure to said actuator, a power driven rapid traverse pump for delivering fluid at low pressure to said actuator, and a valve shiftable in response to the action of fluid from at least one of said pumps for controlling the direction in which the fluid from the variable displacement pump propels said actuator.

2. In a material working apparatus, a frame, a spindle rotatably supported therein, driving means, a clutch mechanism for controlling the delivery of power from said driving means to said spindle, a shiftable supporting machine element, a fluid operated actuator for moving said element, a variable displacement pump driven in timed relation with said spindle for propelling said actuator, means for delivering fluid at relatively low pressure to said actuator, said delivery means being operable independently of said variable displacement pump, means controlled by the low pressure fluid for shifting the clutch mechanism, and means for controlling the direction in which the variable displacement pump propels said actuator.

3. A hydraulic actuator system for controlling a reversible rotary member and a reciprocable supporting element, reciprocable with respect to said rotary member, including a hydraulic actuator for propelling said reciprocable element, driving means for said rotary member, a clutch for controlling the direction of rotation imparted to said rotary member, and means controllable in response to pressure of fluid which shifts said actuator for actuating said clutch upon the completion of a predetermined movement in a given direction of said reciprocable element irrespective of load conditions, whereby to maintain a synchronized relation between the direction of movement of the reciprocable element and the direction of rotation of said rotary member.

4. A hydraulic actuator system for controlling a reversible rotary member and a reciprocable supporting element reciprocable with respect to said rotary member, including a hydraulic actuator for propelling said reciprocable element, driving means for said rotary member, a clutch for controlling the direction of rotation imparted to said rotary member, a hydraulically operable means controllable by fluid pressure which reverses said actuator for controlling the actuation of said clutch irrespective of load conditions, whereby to maintain a synchronized relation between the direction of movement of the reciprocable element and the direction of rotation of said rotary member, and means for interrupting the driving connection between said driving means and said rotary member.

5. In combination with a spindle and a reciprocable table of a milling machine, a hydraulic actuator system including a fluid operated actuator for imparting reciprocation to said table, a closed hydraulic circuit including fluid channels and a variable feed pump for imparting movement in either direction and controlling the movement in either direction of said actuator, a hydraulic circuit including fluid channels for imparting rapid traverse to said table, and fluid controlled mechanism coupled therewith in such a manner as to enable each of said circuits having fluid channels whereby said circuits are adapted to be operable independently of the other.

6. In combination with a reversible spindle and a reciprocable table of a milling machine, a hydraulic actuator system including a fluid operated actuator for imparting reciprocation to said table, a closed hydraulic circuit including fluid channels and a variable feed pump for imparting movement in either direction and controlling the movement in either direction of said actuator, a hydraulic circuit including fluid channels for imparting rapid traverse to said table, driving means for rotating said spindle, and hydraulic actuator means automatically responsive to fluid pressure in the system for controlling the direction of rotation of said spindle in accordance with the direction of movement of said table.

7. In combination with a reversible spindle and a reciprocable table of a milling machine, a hydraulic actuator system including a fluid operated actuator for imparting reciprocation to said table, a closed hydraulic circuit including a variable feed pump for imparting movement in either direction to said actuator, a hydraulic circuit for imparting rapid traverse to said table, driving means for rotating said spindle, a clutch mechanism for controlling the direction of rotation imparted by said driving means, and means automatically operable in response to the fluid action in said hydraulic system for controlling the actuation of said clutch.

8. In combination with a reversible spindle and a reciprocable table of a milling machine, a fluid operated actuator for imparting reciprocation to said table, driving means for imparting rotation to said spindle, means automatically controllable by the pressure of the fluid which shifts said actuator for effecting a reversal of rotation of said spindle upon the completion of a predetermined movement in a given direction of the table, whereby to maintain a predetermined relation between the direction of movement of the table and the direction of rotation of the spindle, and means for controlling the driving connection between the spindle and said driving means.

9. In combination with a reversible spindle and a reciprocable table of a milling machine, a fluid operated actuator for imparting reciprocation to said table, driving means for imparting rotation to said spindle, and means automatically responsive to pressure of fluid which reverses said actuator for controlling the reversal of rotation of said spindle upon the completion of a predetermined movement of said table irrespective of load conditions, whereby to maintain a synchronized relation between the direction of movement of the table and the direction of rotation of the spindle.

10. In combination with a reversible spindle and a reciprocable table of a milling machine, a hydraulic actuator for imparting reciprocation to said table, driving means for imparting rotation to said spindle, clutch mechanism for controlling the connection between said driving means and said spindle, a second clutch mechanism for controlling the direction of rotation of said spindle, and means for timingly controlling the functioning of said clutch mechanisms in accordance with the movement of said table, at least one of said clutch mechanisms being controlled in response to the pressure of fluid which shifts said actuator.

11. In combination with a reversible spindle and a reciprocable table of a milling machine, a fluid operated actuator for imparting reciprocation to said table, driving means for imparting rotation to said spindle, a feed pump driven in synchronism with said spindle, a clutch mechanism for controlling the starting and stopping of said spindle and the consequent starting and stopping of said feed pump, a second clutch mechanism interposed between said first clutch mechanism and said spindle for controlling the direction of movement of said spindle, and means for timingly controlling the functioning of said clutch mechanisms in accordance with the movement of said table.

12. In combination with a reversible spindle and a reciprocable table of a milling machine, a hydraulic actuator for imparting reciprocation to said table, driving means for imparting rotation to the spindle, a clutch mechanism for controlling the delivery of power to said spindle, a second clutch mechanism interposed between the first clutch mechanism and said spindle for controlling the direction of rotation of said spindle, a feed pump for imparting feeding movement to said actuator, a rapid traverse pump for imparting rapid movement to said actuator, and means for controlling the timed functioning of said clutch mechanisms in accordance with the movement of said table, whereby rotation of the spindle will be arrested during the operative functioning of the rapid traverse pump.

13. In combination with a reversible spindle and a reciprocable table of a milling machine, a hydraulic actuator for imparting reciprocation to said table, driving means for imparting rotation to the spindle, a clutch mechanism for controlling the delivery of power to said spindle, a second clutch mechanism interposed between the first clutch mechanism and said spindle for controlling the direction of rotation of said spindle, a feed pump for imparting feeding movement to said actuator, a rapid traverse pump for imparting rapid movement to said actuator, hydraulically responsive means for shifting said clutch mechanisms, and valve means for controlling the timed functioning of said clutch shifting means, whereby spindle rotation is arrested during the operative functioning of the rapid traverse pump.

14. In a machine tool, a drive shaft, a support therefor, a prime mover, clutching means for controlling the driving connection between said prime mover and said drive shaft, a plurality of transmissions adapted to be driven from said drive shaft, means for adjusting the speeds of the transmissions relative to each other, said transmissions being adapted to maintain synchronized movements irrespective of variation in loads to which they may be subjected, a machine element coupled with each transmission and adapted to be driven in opposite directions thereby, pumping means adapted to be driven independently of said drive shaft, means operable in response to fluid delivered by said pumping means for controlling the functioning of said clutching means, and valve mechanism for governing the functioning of the means which controls said clutch means.

15. In a machine tool, a support, a table reciprocable upon said support, a rotary cutter supporting spindle, means for supporting said spindle with respect to said table, a hydraulic actuator for reciprocating said table, a rapid traverse pump for shifting said actuator at a rapid rate, a feeding pump for shifting said actuator at a feeding rate, a reversing clutch mechanism for controlling the direction of rotation of said spindle, means responsive to fluid pressure for controlling the actuation of said clutch mechanism, a prime mover, a second clutch mechanism interposed between said prime mover and said first clutch mechanism, a hydraulic actuator for controlling the functioning of said second clutch mechanism, and control means for governing the operative functioning of at least one of the hydraulic mechanisms which govern the functioning of said clutch mechanisms.

16. A milling machine including a base, a shiftable member mounted on said base, a spindle supporting member mounted on said base, a plurality of rotary cutters carried by said spindle supporting member, a prime mover for effecting rotation of said cutters, a hydraulic actuator for effecting relative movement between said members to effect a metal removing operation by said cutters, pumping means for causing said actuator and member connected therewith to travel at a relatively high speed in either direction, pumping means adapted to deliver fluid to the intake side of said actuator for propulsion and speed control purposes and for effecting a slower feeding speed of said actuator and member connected therewith in at least one direction, hydraulically operable means for controlling the direction of movement of said cutters with respect to the direction of relative movement of said members, and control mechanism including valve means for governing the operative functioning of said hydraulically operable control means.

17. In a machine tool structure, a support, a plurality of rotary metal removing cutters carried by said support, work supporting means, means for imparting relative movement between the rotary cutters and work supporting means to effect a metal removing operation, mechanism for synchronizing the directional rotation of the cutters with respect to the relative directional movement between said cutters and said work support, and control means for governing the starting, stopping, direction and speed of said table and cutters in accordance with a selected cycle of operation, said control means including a shiftable normally balanced control member.

18. In a machine tool, a support, a frame, a prime mover, a clutch unit supported by said frame, an adjustable spindle transmission supported independently of and oppositely with respect to said clutch unit and in operative alinement with said unit, a variable feed transmission supported by said frame as a unit and operatively associated with said spindle transmission, reciprocable work supporting means carried by said frame, a hydraulic actuator coupled with said work supporting means, a rapid traverse speed transmission supported by said frame independently of the other machine parts for shifting said work holding means, control abutments movable with said work supporting means, and a unitary direction and speed control mechanism for said feed and rapid transmissions supported by said frame and adapted to function in response to the engagement therewith by the control abutments movable with said work holding means.

19. In material working apparatus, a rotary supporting member adapted to be rotated in opposite directions, fluid pressure generating mechanism driven in timed relation with said supporting member and having means for preventing slippage of fluid from the high to the low pressure side thereof, said means including valve means within said fluid pressure generating mechanism, a fluid operated actuator, ducts connecting said actuator with said fluid pressure generating mechanism, said generating mechanism and ducts being so arranged that fluid contained therein may be moved as a unit, whereby the movement experienced by said actuator will be directly proportional to the movement of the rotary supporting member, reversible driving means for said supporting member, and control means for synchronously governing the direction of movement of said actuator and said supporting member.

20. In material working apparatus, rotary supporting means adapted to be rotated in opposite directions, driving means therefor, a variable displacement pump driven in synchronism with said rotary means, a reversible clutch means for said rotary supporting means, means for connecting and disconnecting said rotary means with respect to said driving means, said variable displacement pump being operable automatically when rotation is imparted to said rotary supporting means, a reciprocable hydraulic actuator coupled with said pump, and control mechanism for governing the intermittent operative functioning of the pump irrespective of the direction of movement of said actuator.

21. In material working apparatus, a spindle adapted to be rotated in opposite directions, a fluid operated actuator, a fluid pressure generating mechanism adapted to cause said actuator to experience a speed which is constantly proportional to the speed of rotation of said spindle in both directions, said fluid pressure generating mechanism and actuator being included within a closed fluid circuit, said fluid pressure generating mechanism being operable automatically in response to the rotation of the spindle, driving means for rotating said spindle in opposite directions, and control mechanism for governing a synchronous movement of said spindle and actuator.

22. In material working apparatus, a frame, a spindle reversibly rotatable in said frame, a shiftable carriage, a fluid operated actuator for shifting said carriage, fluid pressure generating mechanism associated with said frame for delivering fluid to said actuator, said fluid pressure generating mechanism including a driving unit and a pressure generating unit, one of said units being detachable without disturbing the position of the other, means connecting said spindle with said fluid pressure generating mechanism, driving means for rotating said spindle in opposite directions, and control means for governing the synchronous functioning of the spindle and actuator.

23. In material working apparatus, a frame, a rotary supporting means adapted to be rotated in opposite directions, a shiftable carriage, a fluid operated actuator for shifting said carriage, a variable displacement pump for delivering fluid to said actuator, a second pump for delivering fluid at low pressure to said actuator, a reservoir for retaining a fluid medium, said reservoir being positioned above the level of said second pump, whereby to effect the delivery of fluid to said second pump under pressure, driving means for rotating said rotary supporting means in opposite directions, and control means for coordinating the direction of rotation of said supporting means with the direction of movement of said carriage.

24. In material working apparatus, a frame, a spindle supported therein and adapted to be rotated in opposite directions, power means, clutch mechanism for controlling the delivery of power from said power means to said spindle, a reciprocable carriage, a hydraulic actuator for moving said carriage in opposite directions, a variable displacement pump driven in timed relation with said spindle for propelling said actuator, means for delivering fluid at a relatively low pressure to said actuator for rapid traverse purposes, and means operated by rapid traverse fluid for timingly controlling the shifting of said clutch mechanism in accordance with the position of said carriage.

25. In material working apparatus, a spindle adapted to be rotated in opposite directions, a shiftable supporting machine part, a hydraulic actuator for shifting said part including a piston and cylinder construction, a feed pump, a prime mover for delivering power to said spindle and said pump, said pump being adapted to propel the shiftable machine part at a feeding rate, means for imparting a rapid traverse movement to said machine part, mechanism for controlling the direction of rotation of the spindle, and control means for initiating the rapid traverse movement of said machine part and for simultaneously causing the stopping of the spindle, whereby to permit movement of the shiftable machine part in a given direction while said spindle remains stationary.

26. In material working apparatus, a supporting spindle adapted to be rotated in opposite directions, fluid pressure generating mechanism driven in timed relation with said supporting spindle, a fluid operated actuator, means connecting said fluid pressure generating mechanism with said actuator in a closed circuit, whereby a governed amount of travel is experienced by the actuator for each revolution of the supporting spindle, means for delivering fluid to said actuator for rapid traverse purposes, and control mechanism operable by rapid traverse fluid for governing the direction of rotation of the spindle in synchronism with the direction of movement of said actuator.

27. In metal working apparatus, a reciprocable supporting means, a rotary supporting means adapted to be rotated in opposite directions, a transmission for delivering power to said rotary supporting means in opposite directions, a shiftable actuator member, a transmission for delivering power to said actuator member connected with said reciprocable supporting means, means positively connecting said transmissions to effect uninterrupted synchronized movement of said transmissions whereby a change in speed of one of said transmissions will correspondingly affect the speed of the other transmission when variation in load is experienced by said shiftable actuator member, a source of power supply common to both transmissions, independent means for imparting rapid traverse to said actuator member without affecting the positive connection between said transmissions and control means for governing the timed functioning of said transmissions.

28. In material working apparatus, a shiftable supporting member, a hydraulic actuator for shifting said member, fluid pressure generating means for imparting reciprocation to said actuator, said fluid pressure generating means and actuator being hydraulically coupled in a manner to deliver fluid to the intake side of said actuator for propulsion and speed control purposes whereby to effect uniform feeding speed in opposite directions to said actuator, a supporting spindle adapted to be rotated in opposite directions, mechanism for controlling the direction of rotation of said spindle, and control means operable automatically for synchronizing the direction of rotation of the spindle and the direction of movement of said shiftable supporting member.

29. In material working apparatus of the class described, a frame, a spindle rotatable within said frame, driving means for imparting rotation to said spindle, a fluid operated actuator, a variable displacement pump driven in timed relation with said spindle for delivering fluid at relatively high pressure to the intake side of said actuator for propelling and speed control purposes, a constantly driven rapid traverse pump connected with said driving means for delivering fluid at low pressure to said actuator, conduits connecting said pumps with said actuator so as to enable said variable displacement pump to operate independently of said rapid traverse pump, and means for controlling the direction in which the fluid from said variable displacement pump propels said actuator.

30. A hydraulic actuator system for controlling a reversible rotary member and a supporting element reciprocable with respect to the axis thereof, including a hydraulic actuator for propelling said reciprocable element, and automatically operable reversible transmission means for said rotary member including hydraulically shifted direction control means constructed and arranged for instantaneous action irrespective of load conditions, said direction control means being operable in response to pressure of fluid which reverses said actuator for effecting a reversal of rotation of said rotary member upon the completion of a stroke of said reciprocable element, whereby to maintain a predetermined relation between the direction of movement of the reciprocable element and the direction of rotation of said rotary member.

31. A hydraulic actuator system for controlling a reversible rotary member and an element reciprocable transversely of the axis thereof, including a hydraulic actuator for propelling said reciprocable element, driving means for said rotary member, and automatically and hydraulically actuated means for effecting the reversal of rotation of said rotary member upon the completion of a stroke of said reciprocable element, said hydraulically actuated means being responsive to pressure of fluid which reverses said actuator and adapted for instantaneous action irrespective of load conditions, whereby to maintain a predetermined relation between the direction of movement of the reciprocable element and the direction of rotation of said rotary member.

32. A hydraulic actuator system for controlling a reversible rotary member and a reciprocable supporting element, including a hydraulic actuator for propelling said reciprocable element, driving means for said rotary member, a clutch for controlling the direction of rotation imparted to said rotary member, and hydraulically operable means controllable by fluid pressure which reverses said actuator for controlling the actuation of said clutch irrespective of load conditions, whereby to maintain a synchronized relation between the direction of movement of the reciprocable element and the direction of rotation.

33. In combination with a reversible spindle and a reciprocable table of a milling machine, a hydraulic actuator for imparting reciprocation to said table, driving means for imparting rotation to the spindle, a clutch mechanism for controlling the delivery of power to said spindle, a feed pump for imparting feeding movement to said actuator, a rapid traverse pump for imparting rapid movement to said actuator, and means for controlling the timed functioning of said clutch mechanism in accordance with the feed and rapid traverse movements of said table, whereby rotation of the spindle will be arrested during the operative functioning of the rapid traverse pump.

34. In combination with a reversible spindle and a reciprocable table of a milling machine, a hydraulic actuator for imparting reciprocation to said table, driving means for imparting rotation to the spindle, a clutch mechanism for controlling the delivery of power to said spindle, a feed pump for imparting feeding movement to said actuator, a rapid traverse pump for imparting rapid movement to said actuator, hydraulically responsive means for shifting said clutch mechanism, and valve means for controlling the timed functioning of said clutch shifting means in accordance with the feed and rapid traverse movements of said table, whereby spindle rotation is arrested during the operative functioning of the rapid traverse pump.

35. In material working apparatus, a rotary supporting member adapted to be rotated in opposite directions, fluid pressure generating mechanism driven in timed relation with said supporting member and having means for preventing slippage of fluid from the high to the low pressure side thereof, said means including valve means within said fluid pressure generating mechanism, a fluid operated actuator, ducts connecting said actuator with said fluid pressure generating mechanism, said generating mechanism and ducts being so arranged that fluid contained therein may be moved as a unit, whereby the movement experienced by said actuator will be directly proportional to the movement of the rotary supporting member, reversible driving means for said supporting member, and hydraulically shiftable valve means for synchronously governing the direction of movement of said actuator and said supporting member.

36. In material working apparatus, rotary supporting means adapted to be rotated in opposite directions, driving means therefor, a variable displacement pump driven in synchronism with said rotary means, a reversible clutch means for said rotary supporting means, means for connecting and disconnecting said rotary means with respect to said driving means, said variable displacement pump being operable automatically when rotation is imparted to said rotary supporting means, a reciprocable hydraulic actuator coupled with said pump, and hydraulically shiftable valve means for governing the intermittent operative functioning of the pump irrespective of the direction of movement of said actuator.

37. In material working apparatus, a spindle adapted to be rotated in opposite directions, a reciprocable supporting member, a hydraulic actuator for reciprocating said supporting member, means for rotating said spindle in opposite directions, a relatively high pressure pumping mechanism for imparting uniform feeding speed to said actuator in opposite directions, a second pumping mechanism for imparting rapid traverse to said actuator, and control mechanism for rendering the pumping mechanism functionally inoperative for propelling purposes with respect to the actuator during the functioning of the first mentioned pumping mechanism and for maintaining said feed pumping mechanism hydraulically inoperative.

38. The structure set forth in claim 37 including a power driving means for the spindle and clutch means for controlling the direction of rotation of said spindle.

39. The structure set forth in claim 37 wherein the control mechanism includes hydraulically shiftable valve means.

ERNEST J. SVENSON.